United States Patent
Harres et al.

(10) Patent No.: US 7,112,031 B2
(45) Date of Patent: Sep. 26, 2006

(54) METHOD AND APPARATUS FOR MECHANIZED POCKET SWEEPING

(75) Inventors: Luiz C. Harres, Allen, TX (US); Richard C. Hickey, San Augustine, TX (US); Harold G. Burkett, Jr., Carrollton, TX (US)

(73) Assignee: Siemens Energy & Automation Inc., Arlington, TX (US)

( * ) Notice: Subject to any disclaimer, the term of this patent is extended or adjusted under 35 U.S.C. 154(b) by 133 days.

(21) Appl. No.: 10/112,780

(22) Filed: Mar. 29, 2002

(65) Prior Publication Data

US 2003/0006174 A1     Jan. 9, 2003

Related U.S. Application Data

(60) Provisional application No. 60/280,169, filed on Mar. 30, 2001.

(51) Int. Cl.
*B65G 11/04* (2006.01)
*B07C 5/00* (2006.01)

(52) U.S. Cl. .................. 414/593; 414/281; 414/790.2; 414/807; 209/509; 209/900

(58) Field of Classification Search ................ 414/280, 414/281, 282, 593, 798.5, 807, 788.1, 790.2, 414/331.1, 331.08, 331.16, 331.18, 925, 414/594, 791.6; 53/235; 198/418.6; 700/214, 700/218; 209/509, 584, 900, 583; 206/499, 206/503, 504, 557
See application file for complete search history.

(56) References Cited

U.S. PATENT DOCUMENTS

| | | | | |
|---|---|---|---|---|
| 3,050,173 A | * | 8/1962 | Wimmer | 198/468.1 |
| 3,930,351 A | * | 1/1976 | Ueda et al. | 53/475 |
| 4,468,165 A | * | 8/1984 | Kawasaki | 414/403 |
| 4,482,059 A | * | 11/1984 | Horii et al. | 209/569 |
| 5,104,114 A | | 4/1992 | Gillmann | 271/181 |
| 5,347,790 A | | 9/1994 | Romanenko et al. | 53/443 |
| 5,421,464 A | * | 6/1995 | Gillmann et al. | 209/584 |
| 5,857,830 A | * | 1/1999 | Harres et al. | 414/798.9 |
| 5,993,132 A | | 11/1999 | Harres et al. | 414/417 |
| 6,135,697 A | | 10/2000 | Isaacs et al. | 414/281 |

FOREIGN PATENT DOCUMENTS

WO    WO 97/20644    6/1997

* cited by examiner

*Primary Examiner*—Eileen D. Lillis
*Assistant Examiner*—Michael Lowe
(74) *Attorney, Agent, or Firm*—Philip G. Meyers

(57) ABSTRACT

A method for sweeping mail pieces from pockets of a sorter including the steps of (1) sorting mail pieces to a plurality of pockets based upon a preselected sorting criteria, (2) positioning an unloading robot adjacent to a selected one of the pockets when the pocket has received a predetermined volume of mail pieces, the robot carrying a tray having upright side walls and bottom wall, (3) engaging the pocket with a sweeping apparatus, (4) removing mail pieces in the pocket with the sweeping apparatus, (5) loading the removed mail pieces into the tray carried by the robot, and (6) carrying the tray containing the removed mail pieces to a destination with the robot. An apparatus for implementing the method is also disclosed.

20 Claims, 4 Drawing Sheets

METHOD AND APPARATUS FOR MECHANIZED POCKET SWEEPING

This application claims priority of U.S. Provisional Patent Application Ser. No. 60/280,169, filed Mar. 30, 2001.

TECHNICAL FIELD

The present invention relates to the field of mail sorting, and particularly to a method and apparatus for mechanized sweeping of a pocket, and more specifically, to a method and apparatus for mechanized sweeping of mail items from the pockets of an automated mail sorting machine.

BACKGROUND OF THE INVENTION

Modern postal services, for example, the U.S. Postal Service, handle massive volumes of mail pieces on a daily basis. Machines for receiving and sorting these massive volumes of letter mail are known. Typically, such machines are adapted to receive large volumes of flat articles and sort the articles into a plurality of pockets or bins based upon selected criteria. In the case of letter mail, the criteria is associated with the destination of the individual mail pieces which may be an indicia such as a Zip+4 destination code. Typically, such sorting machines have a feeding station, sensing and detecting equipment for determining the appropriate output compartment or pocket for the article to be sorted and diverting gates or other mechanisms for selectively diverting articles to selected ones of an array of output compartments or pockets for the sorted articles. An example of an advanced sorting machine is the DBSCII sorting device, available from Siemens ElectroCom, L. P., Arlington, Tex.

The feeding and sorting of articles by a mail sorter to a pocket normally continues until the pocket become sufficiently full of a stack of sorted articles or mail. When the pocket or receiving compartment is full, an operator manually removes a stack of the sorted articles from the pocket and places the stack of articles into a box. This removal of stacked articles is typically referred to as "sweeping" the compartment or pocket. The stack of sorted articles placed by the operator into a box may be further reprocessed through the same sorting machine, may be transferred to another sorting machine for additional sorting or may be transported to a delivery person, such as a mail carrier, or may be transmitted for ultimate delivery to the intended location, address or recipient when all desired sorting is completed.

Although automatic sorting machines have greatly speeded and improved prior processes for manual article sorting, sweeping and retrieving the sorted and stacked articles from the output pockets of the sorting machine is still a manual operation. The need for such manual sweeping is undesirable for ergonomic reasons because of the bending and reaching required of humans to perform these tasks. Furthermore, the need for such manual handling of mail articles tends to limit the maximum benefits of automation that can be gained from the automatic sorting machines.

Thus there exists a need for a mechanized sweeping method and apparatus to alleviate the shortcomings of manual sweeping.

SUMMARY OF THE INVENTION

The invention provides a method for sweeping mail pieces from pockets of a sorter including the steps of (1) sorting mail pieces to a plurality of pockets based upon a preselected sorting criteria, (2) positioning an unloading robot adjacent to a selected one of the pockets when the pocket has received a predetermined volume of mail pieces, the robot carrying a tray having upright side walls and bottom wall, (3) engaging the pocket with a sweeping apparatus, (4) removing mail pieces in the pocket with the sweeping apparatus, (5) loading the removed mail pieces into the tray carried by the robot, and (6) carrying the tray containing the removed mail pieces to a destination with the robot.

In one aspect, the invention includes an apparatus for sweeping mail pieces from the pockets of a sorter including an unloading robot for carrying and positioning a mail tray with a false bottom, adjacent to a pocket to be emptied, the robot including a sweeper drive assembly and means for lifting the false bottom of the tray. A sweeper assembly for the pocket includes a telescoping arm with a projection that is coupled to a moveable gate for sweeping the pocket. The sweeper assembly is engaged by the sweeper drive assembly carried by the unloading robot to sweep letter mail laterally from the pocket.

In one aspect the sweeper drive assembly includes a frame and a sliding elevator clamped to a timing belt for lateral movement. The elevator is mounted on a pair of parallel rails for longitudinal movement along a frame and includes a hook-like sweeper arm catch, configured to engage a projection on the sweeper arm and move the sweeper arm horizontally and vertically to sweep the mail pocket. Lifting means for lifting a false bottom of the tray to align the false bottom with the bottom of the pocket comprise one or more cylinders operating through apertures in the bottom of the mail tray. Once the mail tray is positioned adjacent to the pocket to be swept, the sweeper drive assembly engages the sweeper arm to sweep mail from the pocket onto the false bottom of the mail tray.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
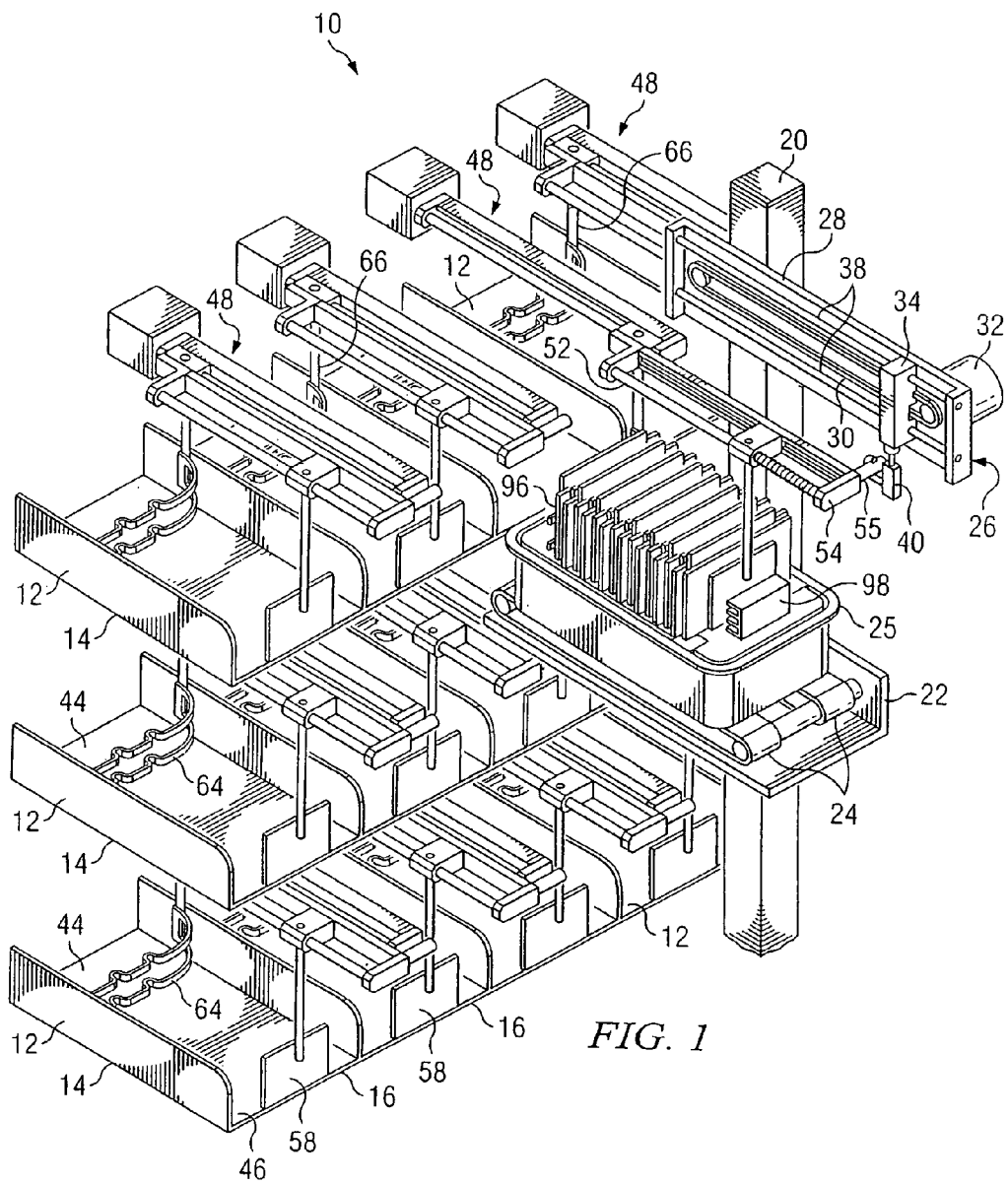
FIG. 1 is a perspective view of an array of mail receiving pockets used for sorting mail including a sweeping apparatus suitable for practicing the method of the invention.
Figure 2:
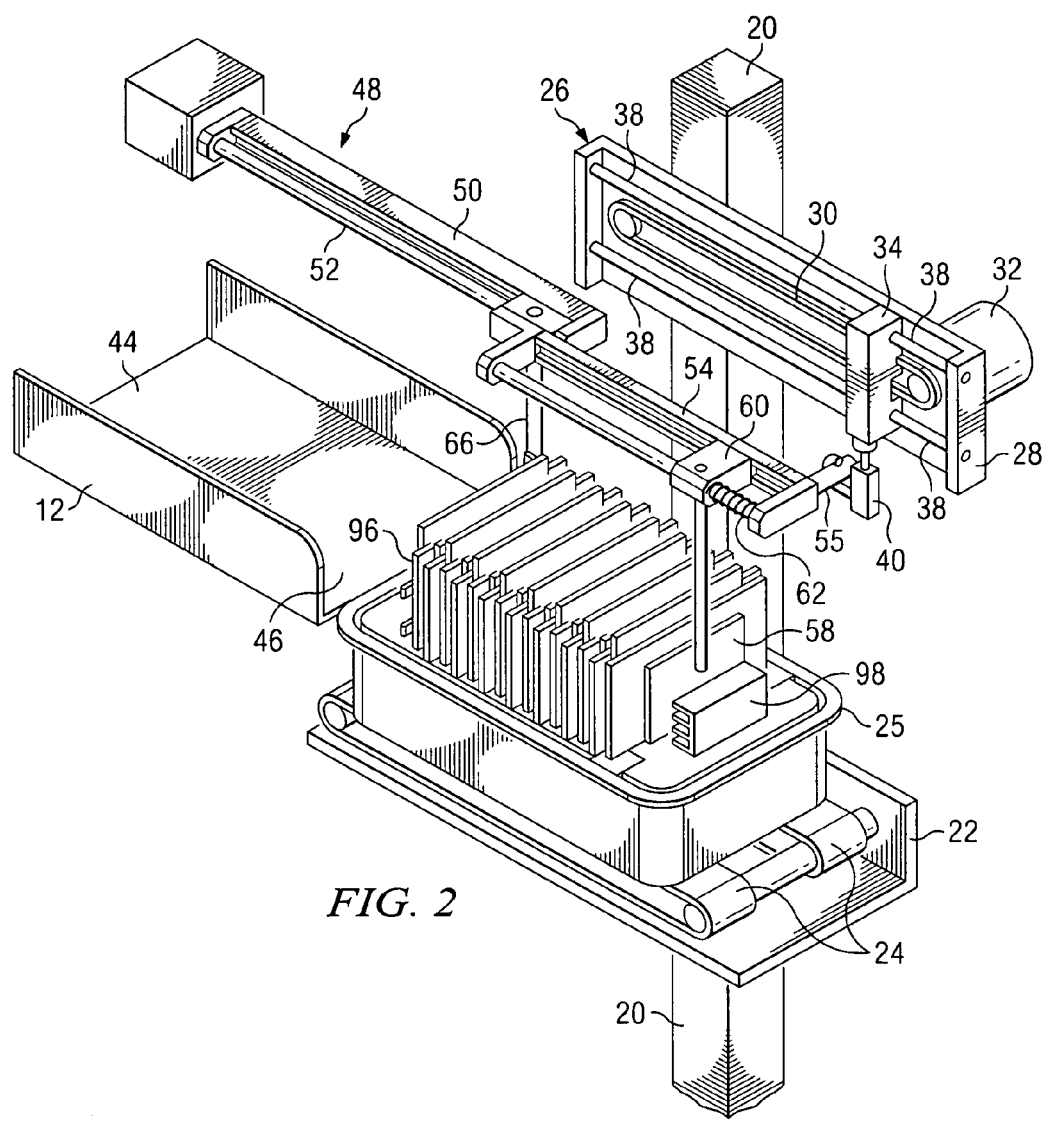
FIG. 2 is partial perspective view of an individual pocket and the unloading robot during the sweeping operation.

Turning now to FIGS. 1 and 2 the invention may be implemented with a mail sorting machine includes a mechanized mail receiving and sweeping system 10. A plurality of pockets 12 are arranged in a plurality of rows 14 and columns 16 for receiving mail pieces from an automated sorter that uses a preselected criteria such as destination indicia, for example a bar code appearing on the mail, to sort the mail pieces into pockets 12. System 10 includes an unloading robot 20 equipped with a tray platform 22 including a pair of belts 24 for loading and unloading trays 25. Robot 20 is configured for longitudinal movement to enable alignment of the robot with a selected column 16 of pockets 12. Tray platform 22 is configured for vertical movement, allowing the platform to be aligned a particular row 14 of pockets 12. Robot 20 is provided with a sweeper drive assembly 26 for sweeping pockets 12 after the robot has been positioned at a full pocket.

Sweeper drive assembly 26 includes a frame 28, timing belt 30 driven by motor 32 and a sliding elevator 34 that is clamped to belt 30 for moving elevator 34 laterally. Although as illustrated elevator 34 is driven with a belt drive, any conventional drive means such as a screw type cam, hydraulic or pneumatic cylinder, rack and pinion drive or similar drive unit may be utilized to move elevator 34, depending upon the particular design. Elevator 34 is mounted on a pair of parallel rails 38 for movement along frame 28 parallel to rails 38 and includes a hook-like sweeper arm catch 40, mounted for vertical movement relative to frame 28 Sweeper arm catch 40 may be raised and lowered with any conventional linear drive such as a solenoid or pneumatic or hydraulic cylinder (not shown). Sweeper arm catch 40 is configured to engage a projection 55 that is part of or coupled to telescoping sweeper arm 54 enabling the sweeper drive assembly 26 to move the sweeper arm horizontally and vertically to sweep pocket 12.

Each pocket 12 includes an input end 44 and discharge end 46 and is provided with a mail sweeper assembly 48. Sweeper assembly 48 includes a stationary frame 50, support rail 52 and a telescoping sweeper arm 54, including a paddle support rail 56 and paddle 58 mounted for movement along rail 56. As noted above, sweeper arm 54 also includes projection 55, enabling catch 40 to engage the sweeper arm. Paddle 58 is mounted on rail 56 with a sliding clamp 60 and is biased toward the input end of 44 of pocket 12 with a spring 62. In operation, the biasing action of spring 62 holds paddle 58 against mail sorted into pocket 12. In this regard it should be noted that paddles 58 in FIG. 1 are shown extended to the discharge ends 46 of pockets 12 for the purpose of illustration. In normal operation, paddles 58 would be biased against sweeper gates 64, or mail in the pocket, by action of springs 62.

A sweeper gate 64 mounted on shaft 66 is pivotable between an open position and a closed position. Shaft 66 and/or Sweeper gate 64 may be biased and pivoted using any convention means (not shown) such as a solenoid, electric motor, or hydraulic or pneumatic cylinder mounted on frame 50 or on pocket 12. As shown, sweeper gate 64 includes a pair of fingers 68, each of the fingers having a pair of spaced apart notches 70, positioned so that each of the notches 70 is vertically aligned with a corresponding notch 70 in the other finger.

In operation, mail pieces are sorted by destination into pockets 12. When a particular mail piece is identified or associated with a destination corresponding to a particular pocket, the sorting machine pivots shaft 66, opening gate 64 to allow the mail piece to enter the pocket 12. Mail directed into pocket 12 accumulates, forming a stack 96 between spring loaded paddle 58 and sweeper gate 64. When a pocket 12 has received a predetermined volume of mail pieces, a sensor such as a limit switch or proximity sensor (not shown) sends a signal to the computer or microprocessor (not shown) controlling the sorting machine, indicating that the pocket needs to be swept. The computer then directs robot 20 to retrieve an empty tray 25 if the robot is not already carrying an empty tray on tray platform 22, and position tray carrier 22 adjacent to the pocket 12 to be swept.

Figure 3:
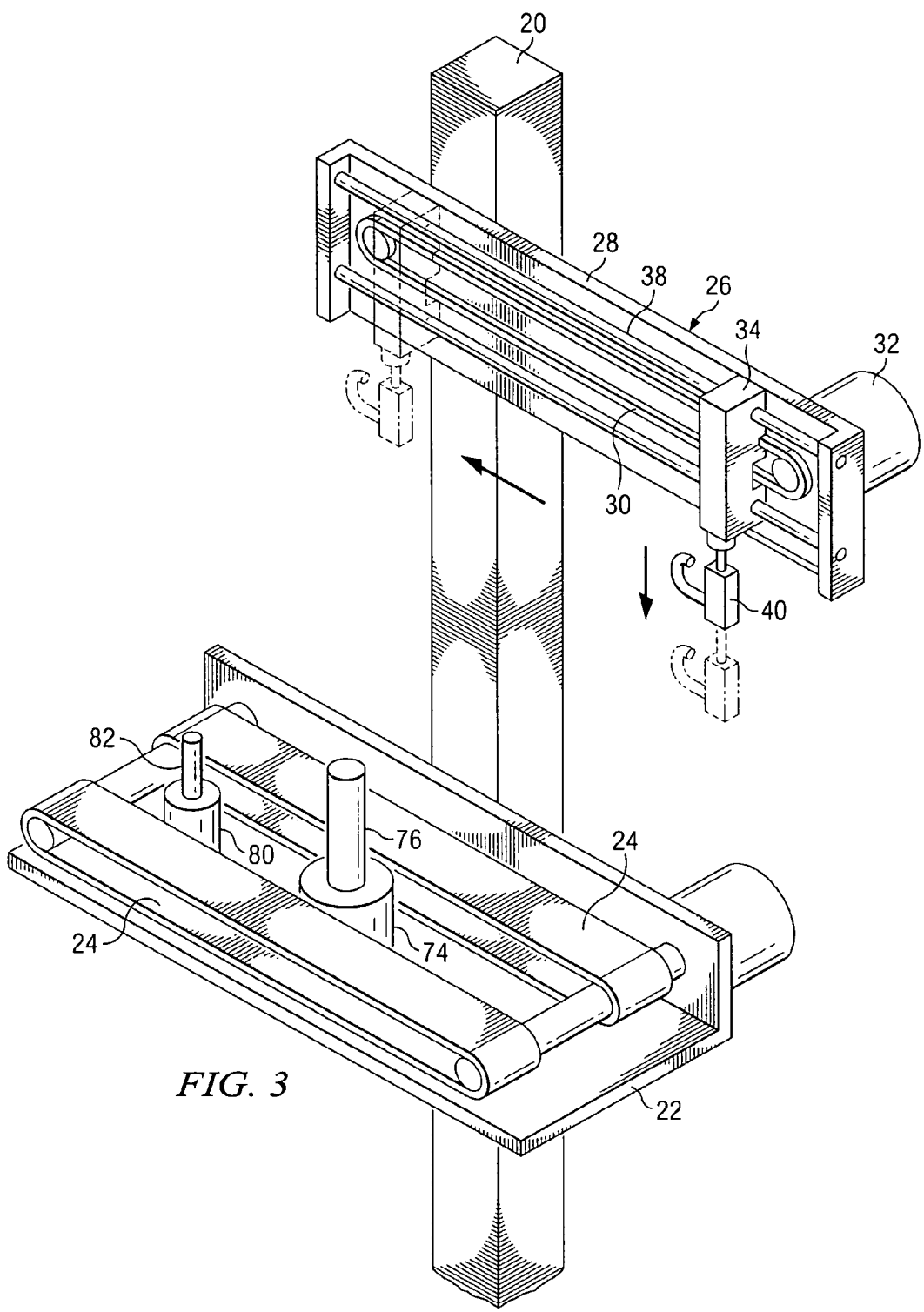
FIG. 3 is a partial perspective view of the unloading robot showing the sweeper drive assembly.
Figure 4:
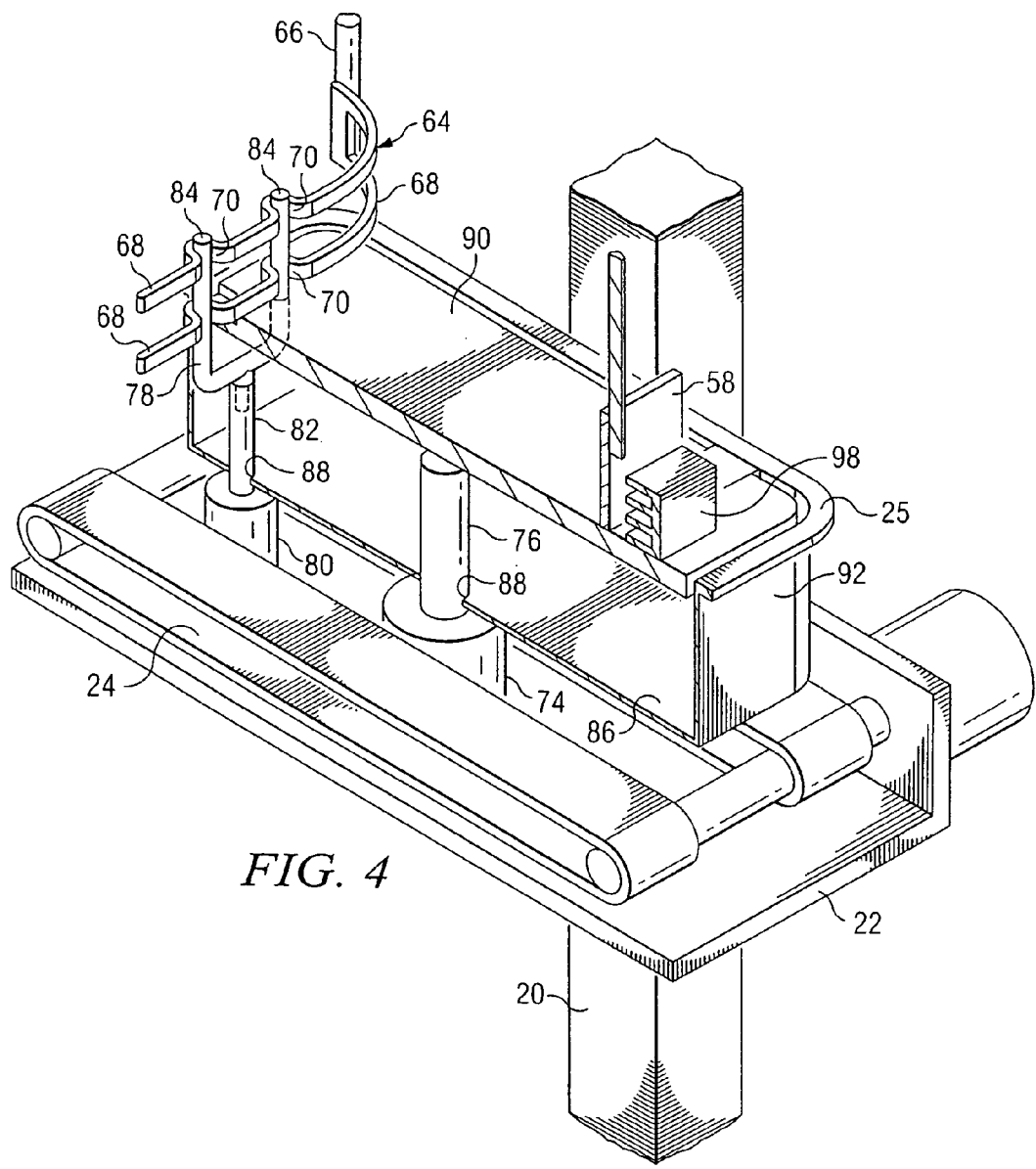
FIG. 4 is a partial perspective view of the unloading robot with a mail tray positioned on the robot with a portion of the tray cut away.

Referring now to FIGS. 2 and 3, robot 20 includes a tray platform 22 with belts 24 for positioning a false bottom mail tray 25 on the platform, a lift cylinder 74 with a shaft 76 for raising and lowering false bottom 90 of mail tray 25. Tray platform 22 also includes a retainer cylinder 80 and shaft 82 for engaging and lifting a retainer 78, mounted in tray 25, that includes a pair of retaining fingers 84. When tray carrier 22 is positioned adjacent to the pocket 12 to be swept, belts 24 are activated to position the edge of tray 25 immediately adjacent to the discharge end 46 of pocket 12 so as to eliminate or minimize any gap between tray 25 and pocket 12. Lift cylinder 74 is actuated and shaft 76 extends, raising the false bottom 90 of tray 25 so as to align the false bottom with the top of tray 25 and the bottom of pocket 12 as shown in FIG. 2.

After mail tray 25 has been positioned adjacent pocket 12 and false bottom 90 has been raised, belt 30 is activated to position the catch under projection 55 of sweeper arm 54. Elevator 34 is then actuated to raise catch 40 a sufficient distance to engage projection 55. After catch 40 is positioned, belt 30 is actuated to slide elevator 34, engaging projection 55 with catch 40 and moving sweeper arm 54 from a first position (FIG. 3) to a second, extended position (FIG. 2), thereby sliding mail stack 96 from pocket 12 onto false bottom 90 of tray 25. When the mail stack is positioned on false bottom 90, retainer cylinder 80 is activated and shaft 82 engages retainer 78, pushing retainer pins 84 up and into notches 70 in fingers 68 of sweeper gate 64. As shown, tray 25 includes a bottom wall 86 with holes 88 through which shafts 76 and 82 operate.

When retainer pins 84 are positioned in notches 70, lift cylinder 74 and retainer cylinder 80 are actuated, lowering false bottom 90 into tray 25 between walls 92. Mail stack 96 moves with false bottom 90 which lowers the mail stack from between sweeper paddle 58 and sweeper gate 64 into tray 25. When false bottom 90 is fully lowered, mail stack 96 is positioned between stack support 98 and retainer pins 84 in mail tray 25.

After the mail stack is removed from between sweeper gate 64 and paddle 58, spring 62 pushes sliding clamp 60 along rail 56 until paddle 58 is positioned adjacent to sweeper gate 64, ready to receive additional mail. Belt 30 is actuated to move elevator 34, returning sweeper arm 54 to its original position. Catch 40 is lowered to disengage projection 55, completing the operation. After the pocket sweeping operation is completed, robot 20 conveys the mail tray to its destination for further processing of the mail.

The operation of the mail sweeping system of the invention is controlled with a computer, microprocessor, programable controller or similar device. Travel and positioning of the various moving components of the system may be conventionally controlled and monitored with a variety of devices such as limit switches, proximity switches, motion detectors, photocells, timers and similar devices, all of which are known.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

The invention claimed is:

1. A method of sweeping mail pieces from pockets of an automated sorting machine of the type which receives mail pieces one at a time, reads destination information from each mail piece, and then conveys each mail piece to one of a plurality of pockets based on the destination information, the method comprising:
   sorting mail pieces to a plurality of the pockets of the sorter based upon a preselected sorting criteria, the mail pieces being stacked on edge in the pockets;
   positioning an unloading robot adjacent to a selected one of the pockets when the pocket has received a predetermined volume of mail pieces, the robot carrying a tray having upright side walls and bottom wall;
   sweeping mail pieces in the pocket with a sweeping apparatus, each of the mail pieces being supported on edge as the mail pieces are swept from the pocket;
   loading the removed mail pieces into the tray carried by the robot; and
   carrying the tray containing the removed mail pieces to a destination with the robot, such that the robot is no longer positioned at the selected one of the pockets.

2. The method of claim 1 wherein the mail pieces are swept laterally out of the pocket and lowered into the tray.

3. The method of claim 1 wherein the sweeping apparatus includes a movable paddle and sweeper gate for holding mail therebetween and the step of sweeping mail pieces comprises moving the mail pieces with the paddle and sweeper gate from the pocket.

4. The method of claim 1 wherein the robot includes a sweeper drive assembly and the method further comprises engaging the sweeper apparatus with the sweeper drive assembly.

5. The method of claim 1 wherein the tray includes a false bottom, and the method further comprising the step of lifting the false bottom with the robot to a position adjacent the top of the upright side walls of the tray.

6. The method of claim 5 wherein a stack of mail is swept from the pocket onto the false bottom.

7. The method of claim 6 wherein the step of loading the removed mail pieces into the tray further comprises lowering the false bottom for a stack of mail from the pocket.

8. The method of claim 7 further comprising supporting the removed mail pieces with a retainer as the false bottom is lowered.

9. A method of sweeping mail pieces from pockets of an automated sorting machine of the type which receives mail pieces one at a time, reads destination information from each mail piece, conveys each mail piece to one of a plurality of pockets based on the destination information and then stacks the mail pieces on edge in the pockets, comprising:
   sorting mail pieces to a plurality of pockets based upon a preselected sorting criteria, each of the mail pieces being supported on an edge as the mail pieces are swept from the pocket;
   positioning a robot adjacent to a selected one of the pockets, the robot including a platform for transporting a tray having upright side walls and a bottom wall;
   sweeping mail pieces from the pocket with a sweeping mechanism that moves the mail pieces laterally from the pocket;
   loading the removed mail pieces into the tray held by the robot; and
   carrying the tray containing the removed mail pieces to a destination with the robot, such that the robot is no longer positioned at the selected one of the pockets.

10. An apparatus for sweeping mail pieces from the pockets of an automated sorting machine of the type which receives mail pieces one at a time, reads destination information from each mail piece, and then conveys each mail piece to one of a plurality of pockets based on the destination information, the apparatus comprising:
    an unloading robot for carrying and positioning a mail tray adjacent to a selected pocket to be emptied, the robot including a sweeper drive assembly;
    a sweeper assembly, that, upon engagement with the sweeper drive assembly, holds mail pieces supported on the edges thereof in the pocket and sweeps letter mail stacked on edge laterally from the pocket into the mail tray held by the robot.

11. The apparatus of claim 10, further comprising lifting means for lifting a false bottom of the tray to align the false bottom with the bottom of the pocket.

12. The apparatus of claim 10 wherein the robot further comprises means for moving the tray laterally with respect to the robot for positioning the tray adjacent to the pocket.

13. An apparatus for sweeping stacks of mail from an automated sorting machine of the type which receives mail pieces, reads information from each mail piece, and then conveys each mail piece to one of a plurality of pockets based on the information, the mail pieces being stacked on edge in the pockets, comprising:
    an unloading robot for positioning a tray adjacent to a selected one of said array of pockets, the tray being configured to receive a stack of mail pieces from the pocket;
    a mechanical sweeper assembly, including sweeping members for grasping a stack of mail pieces stacked on the edges thereof in the pocket therebetween and sweeping the stack of mail pieces laterally from the pocket to the tray; and
    a sweeper drive assembly mounted on the robot for driving the mechanical sweeper assembly to sweep the stack of mail pieces from the tray.

14. The apparatus of claim 13 wherein the robot further comprises means for moving the tray laterally with respect to the robot for positioning the tray adjacent to pocket.

15. The apparatus of claim 13 wherein the robot further comprises a mechanical lifting device for lifting and lowering a false bottom of the tray.

16. The apparatus of claim 13 wherein the robot comprises a vertically movable tray support for moving the tray vertically to align the tray with a selected one of the pockets.

17. A method of sweeping mail pieces from pockets of an automated sorting machine of the type which receives mail pieces one at a time, reads destination information from each mail piece, and then conveys each mail piece to one of a plurality of pockets based on the destination information, comprising:
    sorting the mail pieces one at a time to a plurality of pockets of the automated sorting machine based upon preselected sorting criteria, the mail pieces being stacked on edge in the pockets;
    when a pocket has received a predetermined volume of mail pieces, positioning a removal device by the pocket;

sweeping mail pieces in the pocket with an automated sweeping apparatus, the mail pieces being positioned on an edge as the mail pieces are swept from the pocket, including at least one paddle which engages the mail pieces in the pocket and slides the mail pieces from the pocket onto the removal device; and carrying the removed mail pieces in the removal device away from the sorting pocket to a destination.

18. The method of claim 17, wherein the removal device comprises a tray.

19. The method of claim 18, wherein the removal device further comprises a robot that positions the tray by the pocket and then carries it to the destination after sweeping is completed.

20. The method of claim 17, wherein the mail pieces are stacked on edge in the pocket, and the sweeping step comprises pushing the stack of mail pieces in the pocket using the paddle.

* * * * *